US007736742B2

(12) United States Patent
Thomas et al.

(10) Patent No.: US 7,736,742 B2
(45) Date of Patent: Jun. 15, 2010

(54) OPTICAL ARTICLE COVERED WITH A VISIBLE-ABSORBING, MULTI-LAYER ANTI-REFLECTIVE COATING, AND PRODUCTION METHOD THEREOF

(75) Inventors: Michele Thomas, Orly (FR); Alain Arnal, Villes-sur-Saulx (FR); Yvon Helmstetter, Boviolles (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 812 days.

(21) Appl. No.: 10/596,574

(22) PCT Filed: Dec. 16, 2004

(86) PCT No.: PCT/FR2004/050716

§ 371 (c)(1),
(2), (4) Date: Jun. 16, 2006

(87) PCT Pub. No.: WO2005/059603

PCT Pub. Date: Jun. 30, 2005

(65) Prior Publication Data

US 2007/0178315 A1    Aug. 2, 2007

(30) Foreign Application Priority Data

Dec. 17, 2003 (FR) .................................. 03 51097
Jan. 7, 2004 (FR) .................................. 04 50042

(51) Int. Cl.
*B32B 19/04* (2006.01)
(52) U.S. Cl. ................ 428/412; 428/426; 428/701; 428/702
(58) Field of Classification Search ................ 428/412, 428/701, 702, 426; 204/92.26
See application file for complete search history.

(56) References Cited

U.S. PATENT DOCUMENTS

| 3,962,488 | A |   | 6/1976  | Gillery         | 427/109   |
|-----------|---|---|---------|-----------------|-----------|
| 4,802,755 | A |   | 2/1989  | Hensler         | 351/163   |
| 5,694,240 | A |   | 12/1997 | Sternbergh      | 359/359   |
| 5,719,705 | A | * | 2/1998  | Machol          | 359/581   |
| 5,728,456 | A |   | 3/1998  | Adair et al.    | 428/216   |
| 6,040,053 | A | * | 3/2000  | Scholz et al.   | 428/412   |
| 2006/0118408 | A1 | * | 6/2006 | Myli et al.   | 204/192.26|

FOREIGN PATENT DOCUMENTS

| EP | 0834092       | 4/1998  |
| EP | 1437609       | 7/2004  |
| JP | 2000/171605   | 6/2000  |
| RU | 2200337       | 10/2002 |
| WO | WO 97/27997   | 8/1997  |
| WO | WO 03/034106  | 4/2003  |

* cited by examiner

OTHER PUBLICATIONS

Society of Vacuum Coaters (http://www.svc.org/AboutSVC/Applications-of-Vacuum-Coating.cfm).*

*Primary Examiner*—Timothy M Speer
*Assistant Examiner*—Lauren Robinson
(74) *Attorney, Agent, or Firm*—Fulbright & Jaworski L.L.P.

(57) ABSTRACT

The invention relates to an optical article comprising a transparent substrate made of organic or inorganic glass, with main front and rear faces, at least one of said main faces comprising a multi-layer anti-reflection coating, wherein said anti-reflection coating comprises at least two visible-absorbing layers comprising a sub-stoichiometric titanium oxide, the visible-absorbing layers being such that the relative transmission factor of visible light Tv is reduced by at least 10% compared with the same article not comprising said visible-absorbing layers.

20 Claims, 1 Drawing Sheet

Figure 1:
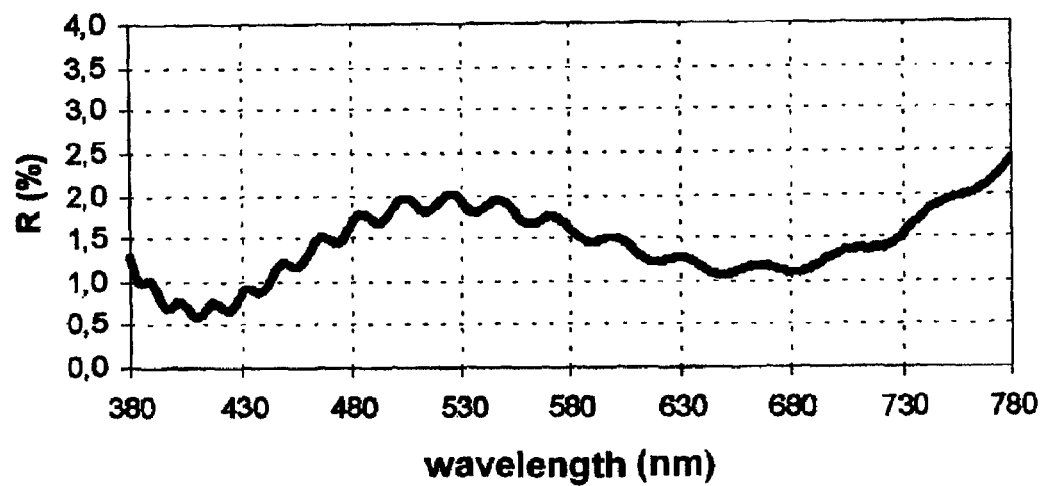

OPTICAL ARTICLE COVERED WITH A VISIBLE-ABSORBING, MULTI-LAYER ANTI-REFLECTIVE COATING, AND PRODUCTION METHOD THEREOF

This application is a national phase application under 35 U.S.C. §371 of International Application No. PCT/FR2004/050716 filed 16 Dec. 2004, which claims priority to French Application No. 03/51097 filed 17 Dec. 2003 and French Application No. 04,50042 filed 7 Jan. 2004. The entire text of each of the above-referenced disclosures is specifically incorporated herein by reference without disclaimer.

This invention relates, in general, to a colored optical article, in particular a colored ophthalmic glass, such as a sun glass and a manufacturing process for such an article.

The most usual technique for coloring organic lenses, for ophthalmic use, consists of soaking the organic glasses (substrates) in an aqueous tinting bath comprising solubilised and/or dispersed pigments, this bath being generally maintained close to boiling point (typically 90 to 95° C.). The pigments then diffuse under the surface of the substrates.

Certain substrates, such as polycarbonates (PC), are very difficult to color using this method. In this case, solvents need to be added to the tinting baths, and these are often aggressive for the substrates. Moreover, the use of solvents poses problems both on the industrial level and for the environment.

Another known technique consists in incorporating a coloring agent in a coating deposited on the substrate.

Thus, U.S. Pat. No. 4,802,744 describes a photochromic eyeglass lens both optical faces of which are coated with a layer of titanium monoxide, the layer of titanium monoxide deposited on the rear face being coated with a $MgF_2$-based anti-reflection layer.

However, in U.S. Pat. No. 4,802,755, the titanium oxide-based layers are not part of a stack with anti-reflection properties.

U.S. Pat. No. 5,694,240 describes a sunglass lens which has a multi-layer coating on the rear concave face. The multi-layer coating comprises a sub-stoichiometric titanium oxide layer TiOx ($0.2 \leq x \leq 1.5$) absorbing in the visible range, adjacent to the substrate, decreasing the transmission of visible light by at least 10%. The multi-layer coating comprises, among other things, a composite layer that reduces UV transmissions and made up of at least two alternate layers (typically $TiO_2$ and $SiO_2$) and possibly a metal oxide or metal fluoride based low refractive index anti-reflection layer.

The international patent application WO 97/27997 particularly describes a visible-absorbing bi-layer anti-reflection coating, and comprising a thin external layer of a low refractive index material, deposited on a very thin absorbent film of a sub-stoichiometric transition metal oxinitride TiOxNy, where x varies from 0.3 to 0.8 and y varies from 0.8 to 1.2. This coating is deposited by cathode sputtering on mineral glass substrates.

Lastly, European patent EP 0834092 B1 describes particularly an optical article having high transmission coefficient, comprising a transparent substrate on which an electrically conductive multi-layer anti-reflection transparent coating is formed. This anti-reflection coating is made up of alternate high refractive index and low refractive index layers comprising titanium oxides and silicon oxides.

However, the optical article of EP 0834092 B1 has a light transmittance at a wavelength of 550 nm that varies from about 98 to 99.5%, and thus cannot be considered to be colored.

The object of the invention is thus to provide an optical article, in particular a colored ophthalmic lens, which overcomes the drawbacks of prior art, and a manufacturing process for such an article.

A further object of the invention is to provide an article as defined heretofore comprising on at least one of its main faces, preferably on the concave rear face, a visible-absorbing anti-reflection coating, exhibiting uniform coloration, which is stable in time and UV-resistant.

A further object of the invention is to provide a process for depositing an anti-reflection coating such as is defined above by vacuum evaporation, without heating the substrate.

According to the invention, the optical article comprises a transparent substrate made of organic or mineral material having main front and rear faces, at least one of said main faces comprising a multi-layer anti-reflection coating, exhibiting uniform coloration, that is stable over time and UV-resistant, wherein said anti-reflection coating comprises at least two layers comprising a sub-stoichiometric titanium oxide, absorbing in the visible range and decreasing the transmission factor (Tv) of the article in the visible range by at least 10%, preferably by at least 40%, and more preferably by at least 80%, compared with the same optical article not coated with an anti-reflection coating according to the invention.

The term visible-absorbing layer as used herein is understood to mean a layer of an anti-reflection coating, the function of which is to reduce the transmission factor of visible light, that is, in a wavelength bandwidth ranging from 380 to 780 nm.

As is well known in the art, the multi-layer anti-reflection coating is formed of a stack of at least two layers with alternatively a low refractive index (LI layer, $n_D^{25} < 1.5$) and a high refractive index, (HI layer, $n_D^{25} \geq 1.5$, preferably $\geq 1.6$).

Classically, these anti-reflection coatings contain four or more alternate LI and HI layers.

As is equally well known, these layers are generally layers of oxides, nitrides, inorganic fluorides or mixtures of these, such as $SiO$, $SiO_2$, $Al_2O_3$, $TiO_2$, $ZrO_2$, $Ta_2O_5$, $Si_3N_4$ or $MgF_2$. Preferably, mineral oxides are used.

According to the invention, the anti-reflection stack comprises at least two visible-absorbing layers, so that the relative transmission factor (Tv) in the visible range of the optical article coated with the anti-reflection coating is decreased by at least 10%, preferably by at least 40%, and more preferably by at least 80% compared with the same article not coated with said anti-reflection coating.

Typically, the optical article coated with the anti-reflection coating according to the invention exhibits a Tv (relative transmission factor in the visible range) of at most 40%, preferably at most 30%, more preferably of less than 20% and most preferably of the order of 15%.

These absorbent layers can comprise one or more sub-stoichiometric titanium oxides TiOx where x is less than 2, preferably ranging from 0.2 to 1.2.

The visible-absorbing layers can be obtained by evaporating a mixture of TiO and $Ti_2O_3$. Preferably the weight ratio of TiO in the mixture of TiO and $Ti_2O_3$ is at least 50%, more preferably at least 60% and still more preferably at least 70%.

Preferably, the visible-absorbing layers of the invention are entirely composed of sub-stoichiometric TiOx oxides. Nevertheless, they may contain non visible-absorbing oxides such as $TiO_2$ in proportions such that these oxides do not affect the absorption properties of visible light, that it to say that a decrease in the transmission factor Tv of at least 10% is obtained.

Hereinafter in the specification and claims, the term "sub-stoichiometric titanium oxide" is used to mean titanium oxides TiOx (x<2), as well as their mixtures and $TiO/Ti_2O_3$ mixtures.

In general, the thickness of the absorbent layers is from 20 to 60 nm, preferably from 30 to 50 nm.

Preferably, the absorbent layers have an extinction coefficient (k) from 0.2 to 2.4 for all wavelengths in the visible range.

Generally, the physical thickness of the (HI) layers varies from 10 to 120 nm, and the physical thickness of the (LI) layers varies from 10 to 100 nm.

By comparison, a $TiO_2$-based layer has an extinction coefficient close to zero for all wavelengths in the visible range.

The absorbent layers have a refractive index n at ambient temperature that can vary from 1.3 to 3.5, preferably from 1.4 to 2.8 in the wavelength bandwidth from 380 to 780 nm.

Preferably, furthermore, the sub-stoichiometric titanium oxide absorbent layers of the invention contain no nitrogen.

Generally, the anti-reflection coating of the optical article according to the invention can be deposited onto all transparent substrates made of organic or mineral glass, preferably onto substrates made of organic glass.

Among the plastic material suitable for substrates, mention can be made of (meth)acrylic and thio(meth)acrylic homo and copolymers, homo and copolymers of carbonate, diethylene glycol bisallylcarbonate such as the material CR-39® marketed by PPG, urethane, thiourethane, epoxide, episulphur, and combinations of these.

The preferred materials for substrates are polyurethanes (PU), polythiourethanes, (meth)acrylic and thio(meth)acrylic polymers, and preferably polycarbonates (PC).

The term polycarbonate (PC) as used in the present invention is understood to include homopolycarbonates, copolycarbonates and sequenced copolycarbonates. The polycarbonates are available commercially, for example from GENERAL ELECTRIC COMPANY with the brand name LEXAN®, from TEIJIN with the brand name PANLITE®, from BAYER with the brand name BAYBLEND®, MOBAY CHEMICAL CORP. with the brand name MAKROLON® and DOW CHEMICAL Co. with the brand name CALIBRE®.

According to a particularly advantageous embodiment of the present invention, the anti-reflection coating formed on at least one of the faces of the substrate comprises a stack of alternating high index (HI) and low index (LI) layers, wherein:
  at least one of the high refractive index (HI) layers is made of a visible-absorbing layer comprising a sub-stoichiometric titanium oxide, and
  at least one of the low refractive index (LI) layers comprises a mixture of silicon oxide ($SiO_2$) and aluminium oxide ($Al_2O_3$).

In this type of embodiment, at least one of the sub-stoichiometric titanium oxide-based absorbent layers is a high refractive index (HI) layer, while the other $SiO_2$ and $Al_2O_3$-based layer is a low index (LI) layer. The LI layer ($SiO_2/Al_2O_3$) preferably contains from 1 to 5% by weight of $Al_2O_3$ compared with the total weight of $SiO_2/Al_2O_3$.

For a vapor phase deposit of the LI layer, preferably the vaporisable source material comprising the mixture of silicon oxide and aluminium oxide contains 1 to 10% by weight of aluminium oxide, preferably from 1 to 2% by weight, relative to the weight of the vaporisable source material.

The low refractive index (LI) layer based on a mixture of silicon oxide and aluminium oxide gives rise to two main effects. One effect is that it improves the uniformity of the coloring over the whole of the optical surface of the optical article, and another effect is that it improves the life of the anti-reflection coating, and its resistance to external degradation, particularly to UV radiation.

Apart from the sub-stoichiometric titanium oxide-based layers and the layer comprising a mixture of silicon oxide and aluminium oxide, the anti-reflection stack as defined above, can also include additional (HI) and (LI) layers.

These additional (HI) layers can be similar to the visible-absorbing titanium oxide-based (HI) layer, but can also be conventional (HI) layers well known in the art.

In the same way, the additional (LI) layers can be similar to the (LI) layer comprising a mixture of silicon oxide and aluminium oxide. But they can also be conventional (LI) layers, such as $SiO_2$ layers for example.

In an embodiment of this type, preferably, the low refractive index layer (LI) comprising a mixture of silicon oxide and aluminium oxide is adjacent to a sub-stoichiometric titanium oxide visible-absorbing layer.

Particularly advantageously, the LI layer comprising a $SiO_2/Al_2O_3$ mixture is adjacent to two sub-stoichiometric titanium oxide visible-absorbing HI layers.

Preferably, the anti-reflection stack comprises at least four alternating HI/LI layers, and better still, 6 layers or more.

In general, the $n_D^{25}$ refractive indices referred to in the present invention are refractive indices at 550 nm wavelength and at 25° C.

According to the present invention, the anti-reflection stack can be applied to the front face and/or the rear face of the substrate, but preferably it is applied exclusively to the rear face. When the visible-absorbing anti-reflection coating is deposited on the rear face of the optical article, the colorimetric aspect of the lens or of the front face is almost identical to that of an untreated lens.

The anti-reflection stack according to the invention is particularly adapted to optical articles with a high concave curvature, preferably with a curvature radius of 90 mm or less, and more preferably of the order of 70 mm.

The substrates of the optical article according to the invention can, if required, be coated with anti-abrasion, impact resistant or anti-scratch coatings, or other coatings in conventional use.

Obviously, the optical article according to the invention can also have coatings formed on the anti-reflection coating that are able to modify the surface properties, such as dirt-repellent, hydrophobic coatings. These are generally fluorosilane type materials, with a thickness of a few nanometers.

The invention also relates to a manufacturing process of an article comprising an anti-reflection stack comprising at least two visible-absorbing sub-stoichiometric titanium oxide layers in which all layers of the anti-reflection coating are deposited by vacuum evaporation.

Figure 2:
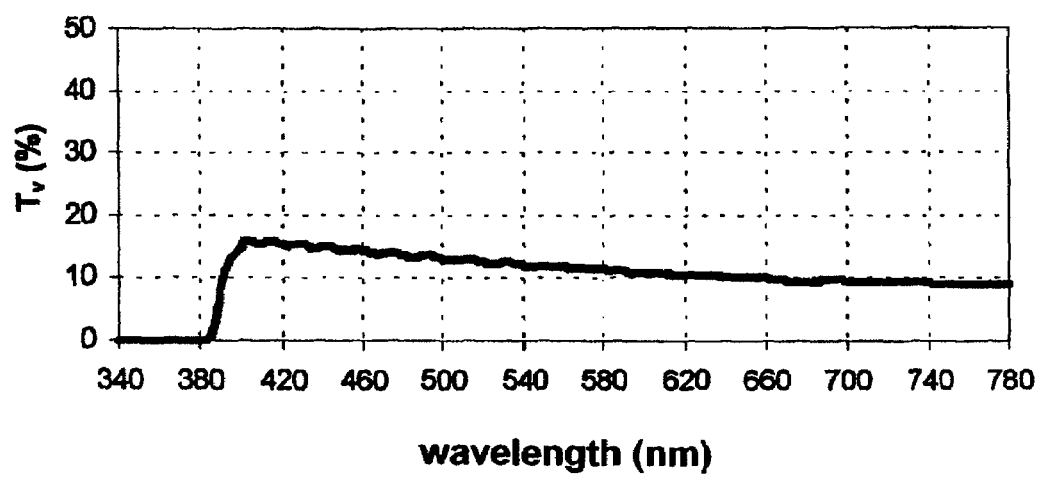

FIGS. 1 and 2 are graphs showing respectively the reflection factor (or reflectance) (R) as a function of wavelength and the transmission factor (T) as a function of wavelength of a colored optical article according to the invention.

The following examples illustrate the invention in more detail without being limitative.

The graph of the transmission factor T as a function of wavelength was measured using a Beckmann DU 70 spectrophotometer.

The relative transmission factor in the visible range Tv was calculated between 380 and 780 nm taking into account:
  the illuminant C (CIE 1931)
  the observer 2°.

The reflection spectrum R=f(λ) was measured with a Zeiss spectrophotometer.

The colorimetric coefficients were calculated between 380 and 780 nm taking into account:
- the illuminant D 65 (CIE 1976)
- the observer 10° h is the hue angle

C is the chroma.

The values of n and k for the TiOx layers were determined as follows:

The refractive index n and the extinction coefficient as a function of wavelength were determined for an "encapsulated" layer of TiOx, that is, one on which a layer of $SiO_2/Al_2O_3$ has been deposited, the whole being deposited on a silicon disc.

For this purpose, a $SiO_2/Al_2O_3$ layer alone was analysed in the first instance by ellipsometry by a method that is very familiar to those skilled in the art.

The thickness of the TiOx layer was determined by mechanical profilometry.

The ellipsometric spectra of the encapsulated layers were measured for 5 angles of incidence, ranging from 55 to 750, and simultaneously inverted, by fixing the thickness of the TiOx layer to that determined by profilometry and by using the properties of the $SiO_2/Al_2O_3$ layer as previously determined.

Extinction Coefficient

When monochromatic light of intensity $I_o$ crosses a homogeneous medium, the intensity of the emergent light I decreases exponentially as the thickness I of the absorbent medium increases:

$I = I_o e^{a1}$ (Bouguer-Lambert's law)

a is a constant known as the absorption coefficient (or attenuation coefficient), characteristic of the medium and the wavelength considered.

The relationship between the absorption coefficient and the extinction coefficient k (which is also the imaginary part of the complex refractive index N=n+ik) is given by the following equation: $a = 4\pi nk/\lambda$.

Reflectance Factor:

$R = \Phi_R/\Phi$

This characterises the reflectance at the interface of two mediums by the ratio of the reflected luminous flux $\Phi_R$ and the incident luminous flux $\Phi$. In general, the spectral reflectance factor $R_\lambda$ is determined for each wavelength $\lambda$ of the incident light.

Relative Reflectance Factor in the Visible Range $R_V$:

This factor is used in ophthalmic optics to characterise the visual effect of reflectance by the ratio of the reflected luminous flux $\Phi_R$ and the incident luminous flux $\Phi$ as they are perceived by the eye, i.e. weighted for each wavelength, by the relative spectral luminous efficiency $V_\lambda$ of the eye. This factor is calculated using the following formula:

$$R_V = \frac{\int_{380}^{780} R_\lambda \Phi_\lambda v_\lambda \, d\lambda}{\int_{380}^{780} \Phi_\lambda v_\lambda \, d\lambda}$$

where $R_\lambda$=spectral reflectance factor, $\Phi_\lambda$=incident spectral flux, $V_\lambda$=relative photopic spectral luminous efficiency of the eye.

Transmission Factor:

$T = \Phi_v/\Phi$

This characterises the transmission properties of a lens by the ratio of the luminous flux $\Phi_v$ emerging from its exit surface to the incident luminous flux $\Phi$ on its entry surface. In general, the spectral transmission factor $T_\lambda$ of the lens is determined for each wavelength $\lambda$ of the incident light.

Transmission Curve:

This describes the physical properties of the lens as a light filter by presenting the variation of its spectral transmission factor $T_\lambda$ as a function of the wavelength. This curve makes it possible to observe the spectral selectivity of the filter and to determine the physical transmission factor T of the lens over the whole range of wavelengths $\lambda_1$ to $\lambda_2$ using the formula:

$$T = \frac{\int_{\lambda_1}^{\lambda_2} \Phi_\lambda T_\lambda \, d\lambda}{\int_{\lambda_1}^{\lambda_2} \Phi_\lambda \, d\lambda}$$

where $\Phi_\lambda$=incident spectral flux.

Relative Transmission Factor in the Visible Range $T_v$:

This factor is specific to ophthalmic optics: it resumes the physiological properties of the filter in a single number: the ratio of the luminous flux emerging from the lens and the luminous flux incident on the lens as they are perceived by the eye, i.e. weighted for each wavelength, by the relative spectral luminous efficiency $V_\lambda$ of the eye. This factor is calculated using the following formula:

$$R_V = \frac{\int_{380}^{780} \Phi_\lambda T_\lambda V_\lambda \, d\lambda}{\int_{380}^{780} \Phi_\lambda V_\lambda \, d\lambda}$$

where $T_\lambda$=spectral transmission factor, $\Phi_\lambda$=incident spectral flux, $V_\lambda$=relative photopic spectral luminous efficiency of the eye. It is this coefficient $T_v$ that is used to describe and classify sunglass lenses.

EXAMPLE 1

An anti-scratch $SiO_2$-based layer, then an anti-reflection coating according to the invention comprising six (6) layers and lastly a hydrophobic top coat were formed by vacuum evaporation on the rear face of a polycarbonate substrate covered with an impact resistant primer coating and an anti-abrasive coating.

The detailed structure of the multi-layer stack is shown in Table 1:

TABLE 1

| Order of evaporation | Thickness of deposited layer | Form and type of starting material |
| --- | --- | --- |
| 1 | 100-110 nm | $SiO_2$ granules |
| 2 | 25-35 nm | Mixture of sub-stoichiometric Ti oxides |
| 3 | 10-20 nm | $SiO_2$ doped with $Al_2O_3$ (LI) (LIMA ® made by UMICORE) |
| 4 | 45-55 nm | Mixture of sub-stoichiometric Ti oxides (HI) (TiO 70%, $Ti_2O_3$ 30% by weight) |
| 5 | 40-50 nm | $SiO_2$ doped with $Al_2O_3$ (LI) (LIMA ® made by UMICORE) |
| 6 | 35-45 nm | Mixture of sub-stoichiometric Ti oxides (HI) |
| 7 | 70-80 nm | $SiO_2$ doped with $Al_2O_3$ (LI) |
| 8 | 1-5 nm | Top Coat |

Properties of the PC Substrate:

Afocal glass made of bisphenol A polycarbonate.

Impact Resistant Primer Coating

Polyurethane latex W234 made by Baxenden. Thickness: 1 μm.

Anti-Abrasion Coating

Epoxysilane hydrolyzate (γ-glycidoxypropyltrimethoxysilane). Thickness: 3 μm.

The above substrate was then processed as indicated below, without introducing $O_2$ into the perimeter.

The deposits were carried out using a BALZERS BAK 760 machine.

Firstly, a vacuum of $3\times10^{-5}$ mbars was created. The substrate was subjected to a surface preparation that consisted of ionic pre-cleaning by bombarding it with argon ions using a Commonwealth Mark II ion gun.

Then an anti-scratch $SiO_2$ layer (layer n° 1) was deposited onto the pre-cleaned surface by evaporating the silicon source material from an electron gun (at 1 nm/s at $5\times10^{-5}$ mbar).

Next the first 5 layers of the anti-reflection stack of the invention mentioned in Table 1 were deposited:

|  | Material | Deposit speed | Pressure (air) |
|---|---|---|---|
| Layer n°2 | TiOx | 1.5 to 2 nm/s | $5 \times 10^{-6}$ mbar |
| Layer n°3 | $SiO_2/Al_2O_3$ | 1 nm/s | $10^{-5}$ mbar |
| Layer n°4 | TiOx | 1.5 to 2 nm/s | $5 \times 10^{-6}$ mbar |
| Layer n°5 | $SiO_2/Al_2O_3$ | 1 nm/s | $10^{-5}$ mbar |
| Layer n°6 | TiOx | 1.5 to 2 nm/s | $5 \times 10^{-6}$ mbar |

The obtained substrate coated with the first five layers of anti-reflection coating was subjected to an electron bombardment process.

Then the sixth layer of the anti-reflection stack ($SiO_2/Al_2O_3$) was deposited at a rate of 1 nm/s and a pressure of $10^{-5}$ mbar.

Lastly the hydrophobic top coat of a material OF110® produced by OPTRON was deposited by evaporation using the Joule effect.

The optical properties of the PC substrate coated in this way are indicated below.

a) Reflectance Properties

The spectral reflectance (at 15° incidence) of the article obtained is shown in FIG. 1.

The reflectance factor values in the visible range (380-780 nm) are used to calculate the performance (Rm, Rv) of the anti-reflection treatment and to quantify the colour of the residual reflection in the CIE L*a*b* calorimetric system. These properties are shown in Table 2.

TABLE 2

| Rm (%) | Rv (%) | Chroma: C* | Hue angle: h (°) | a* | b* |
|---|---|---|---|---|---|
| 1.0 | 1.0 | 10 | 135 | 7.0 | 7.0 | b) Transmission Properties

FIG. 2 shows the relative transmission factor in the visible range Tv as a function of wavelength. It can be seen that with the anti-reflection coating according to the invention, a transmission factor of the order of 15% can be achieved.

Table 3 below qualifies the transmission colour in the CIE L*a*b* system.

TABLE 3

| Tv% | Chroma: C* | Hue angle: h(°) | a* | b* |
|---|---|---|---|---|
| 15 | 7.0 | 270 | −0.5 | −7.0 |

After two months of natural ageing (stored in a paper bag), there are no significant changes in the absorption properties of the anti-reflection coating.

EXAMPLE 2

The same deposit is carried out on afocal ESSILOR ORMA® lenses (material obtained by polymerisation of diethylene glycol diallyl carbonate) coated with a primer coating and an anti-abrasion coating identical to those in Example 1.

The results of natural ageing are identical to those in Example 1.

The invention claimed is:

1. An optical article comprising a transparent substrate made of organic or mineral glass, having main front and rear faces, at least one of said main faces comprising a multi-layer anti-reflection coating,
  wherein said anti-reflection coating comprises at least two visible-absorbing layers comprising a sub-stoichiometric titanium oxide, the visible-absorbing layers being such that the relative transmission factor of visible light Tv is reduced by at least 10% compared with the same article not comprising said visible-absorbing layers, and
  wherein the anti-reflection coating formed on at least one of the faces of the substrate comprises a stack of alternating high refractive index (HI) and low refractive index (LI) layers, wherein:
    at least one of the visible-absorbing layers is a high index (HI) layer comprising a sub-stoichiometric titanium oxide, and
    at least one of the low index (LI) layers comprises a mixture of silicon oxide and aluminum oxide.

2. The article of claim 1, wherein the visible-absorbing layers are such that the relative transmission factor of visible light Tv is reduced by at least 40% compared with the same article not comprising said visible-absorbing layers.

3. The article of claim 1, wherein the visible-absorbing layers have an extinction coefficient (k) equal to or greater than 0.2 for all wavelengths in the visible range from 380 to 780 nm.

4. The article of claim 1, wherein the substrate is made of organic glass.

5. The article of claim 4, wherein the organic glass substrate is made of polycarbonate.

6. The article of claim 1, wherein the low refractive index layer (LI) comprising a mixture of silicon oxide and aluminum oxide is adjacent to a high refractive index (HI) visible-absorbing layer.

7. The article of claim 1, wherein each of the high refractive index layers (HI) of the anti-reflection coating is a visible-absorbing layer made of sub-stoichiometric titanium oxide.

8. The article of claim 1, wherein each of the low refractive index layers (LI) of the anti-reflection coating comprises a mixture of silicon oxide and aluminum oxide.

9. The article of claim 1, wherein the $SiO_2/Al_2O_3$ low refractive index layer (LI) contains 1 to 5% by weight of $Al_2O_3$.

10. The article of claim 1, wherein the anti-reflection stack comprises at least 4 layers.

11. The article of claim 10, wherein the anti-reflection stack comprises the following layers:
- 25-35 nm of a mixture of sub-stoichiometric titanium oxides;
- 10-20 nm of $SiO_2$ doped with $Al_2O_3$;
- 45-55 nm of a mixture of sub-stoichiometric titanium oxides;
- 40-50 nm $SiO_2$ doped with $Al_2O_3$;
- 35-45 nm of a mixture of sub-stoichiometric titanium oxides; and
- 70-80 nm $SiO_2$ doped with $Al_2O_3$.

12. The article of claim 1, wherein the sub-stoichiometric titanium oxide in the absorbent layers is given by the formula TiOx, wherein x is less than 2.

13. The article of claim 12, wherein x varies from 0.2 to 1.2.

14. The article of claim 1, wherein the sub-stoichiometric titanium oxide is obtained from a mixture of TiO and $Ti_2O_3$.

15. The article of claim 14, wherein the weight ratio of TiO in the mixture of TiO and $Ti_2O_3$ is at least 50%.

16. The article of claim 1, further comprising an anti-scratch coating formed on the substrate, the anti-reflection coating being deposited onto said anti-scratch coating.

17. The article of claim 1, wherein the anti-reflection coating is deposited exclusively on the rear face of the substrate.

18. The article of claim 1, further defined as an ophthalmic glass.

19. The article of claim 1, wherein the relative transmission factor of visible light Tv of said article is at most 40%.

20. A process for manufacturing the article of claim 1, wherein all the layers of the anti-reflection stack are deposited by vacuum evaporation.

* * * * *

UNITED STATES PATENT AND TRADEMARK OFFICE
CERTIFICATE OF CORRECTION

| | | |
|---|---|---|
| PATENT NO. | : 7,736,742 B2 | Page 1 of 1 |
| APPLICATION NO. | : 10/596574 | |
| DATED | : June 15, 2010 | |
| INVENTOR(S) | : Thomas et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this
Fourth Day of January, 2011

David J. Kappos
*Director of the United States Patent and Trademark Office*